(12) United States Patent
Bosley et al.

(10) Patent No.: US 7,607,885 B2
(45) Date of Patent: Oct. 27, 2009

(54) METHODS AND APPARATUS FOR OPERATING GAS TURBINE ENGINES

(75) Inventors: Blaine Charles Bosley, Cincinnati, OH (US); Sean Robert Keith, Fairfield, OH (US); Jeffrey Allen Kress, Cincinnati, OH (US); Richard W. Albrecht, Jr., Fairfield, OH (US)

(73) Assignee: General Electric Company, Schenectady, NY (US)

( * ) Notice: Subject to any disclaimer, the term of this patent is extended or adjusted under 35 U.S.C. 154(b) by 388 days.

(21) Appl. No.: 11/461,042

(22) Filed: Jul. 31, 2006

(65) Prior Publication Data

US 2009/0202337 A1 Aug. 13, 2009

(51) Int. Cl.
  *F01D 25/12* (2006.01)
(52) U.S. Cl. .................. 415/121.2; 415/116; 415/173.1; 415/213.1
(58) Field of Classification Search .................. 415/116, 415/173.1, 121.2, 213.1
See application file for complete search history.

(56) References Cited

U.S. PATENT DOCUMENTS

| 4,292,008 | A | * | 9/1981 | Grosjean et al. ............ 415/115 |
| 4,573,865 | A | | 3/1986 | Hsia et al. |
| 5,169,287 | A | | 12/1992 | Proctor et al. |
| 6,726,446 | B2 | * | 4/2004 | Arilla et al. .................. 415/138 |
| 7,147,432 | B2 | * | 12/2006 | Lowe et al. .................. 415/116 |

* cited by examiner

*Primary Examiner*—Ninh H Nguyen
(74) *Attorney, Agent, or Firm*—William Scott Andes, Esq.; Armstrong Teasdale LLP

(57) ABSTRACT

A method of operating a gas turbine engine is provided. The method includes channeling cooling air towards a shroud hanger assembly such that the cooling air flows through a cavity defined in the shroud hanger assembly, directing the cooling air through a plurality of cooling passages extending from the cavity, and discharging the air from the plurality of cooling passages towards an impingement baffle to facilitate cooling a shroud hanging from the shroud hanger.

17 Claims, 6 Drawing Sheets

METHODS AND APPARATUS FOR OPERATING GAS TURBINE ENGINES

BACKGROUND OF THE INVENTION

This invention relates generally to gas turbine engines, and more specifically to a shroud hanger assembly for use with a gas turbine engine.

At least some known gas turbine engines include a fan assembly, a core engine, and a power turbine. The core engine includes at least one compressor that provides pressurized air to a combustor where the air is mixed with fuel and ignited for generating hot combustion gases. The combustion gases are channeled through one or more turbines that extract energy therefrom to power the compressor and an aircraft. Specifically, known turbines include a turbine nozzle which channels combustion gases towards a plurality of circumferentially-spaced turbine blades that extend radially outward from a rotor disk that rotates about the centerline axis of the engine.

Known turbines also include a shroud assembly coupled downstream from the turbine nozzle. The shroud assembly circumscribes the turbine rotor and defines an outer boundary for combustion gases flowing through the turbine. At least some known shroud assemblies include a shroud hanger that is coupled to an outer casing of the engine to provide support to a plurality of shrouds positioned adjacent to, and radially outward of, the tips of the turbine blades. At least some known shroud hanger members include a cooling passage that extends through a portion of the shroud hanger to enable cooling air to be channeled towards the shrouds.

During operation of the gas turbine engine, occasionally debris may travel downstream from the compressor and obstruct a portion of the high pressure turbine. In some instances, the debris may obstruct a portion of at least one cooling passage defined within the shroud hanger. Obstructing cooling passages may significantly reduce the flow of cooling air to the corresponding shroud which may result in high shroud distress. Over time, continued operation with high shroud distress may result in shortening the useful life of the shroud, adversely affect turbine operating performance, and/or shorten the engine maintenance cycle-time.

BRIEF DESCRIPTION OF THE INVENTION

In one aspect, a method of operating a gas turbine engine is provided. The method includes channeling cooling air towards a shroud hanger assembly such that the cooling air flows through a cavity defined in the shroud hanger assembly, directing the cooling air through a plurality of cooling passages extending from the cavity and discharging the air from the plurality of cooling passages towards an impingement baffle to facilitate cooling a shroud hanging from the shroud hanger.

In a further aspect, a shroud hanger assembly is provided. The shroud hanger assembly includes a shroud hanger, and an impingement baffle that is coupled to the shroud hanger. The shroud hanger includes a cavity and a plurality of cooling passages defined therein. Each cooling passage extends from an upstream face of the shroud hanger through the shroud hanger for channeling cooling air towards the impingement baffle. At least two cooling passages are coupled together in flow communication via the cavity.

In an additional aspect, a gas turbine engine is provided. The gas turbine engine includes a compressor, and a turbine assembly coupled downstream the compressor. The turbine assembly includes a shroud hanger assembly at least partially circumscribing the engine. The shroud hanger assembly includes a shroud hanger, and an impingement baffle that is coupled to the shroud hanger. The shroud hanger includes a cavity and a plurality of cooling passages defined therein. Each cooling passage extends from an upstream face of the shroud hanger through the shroud hanger for channeling cooling air towards the impingement baffle. At least two cooling passages are coupled together in flow communication via the cavity.

DETAILED DESCRIPTION OF THE INVENTION

Figure 1:
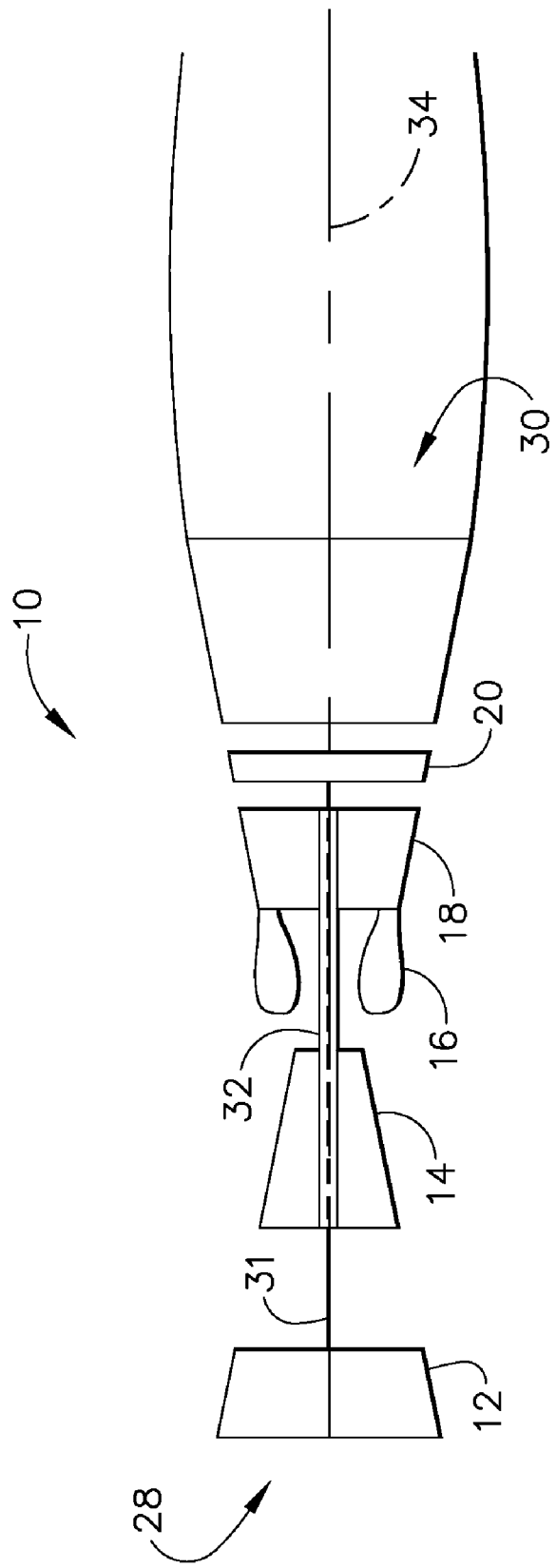
FIG. 1 is a schematic illustration of an exemplary gas turbine engine.

FIG. 1 is a schematic illustration of a gas turbine engine 10 that includes, in an exemplary embodiment, a fan assembly 12, a high pressure compressor 14, and a combustor 16. Engine 10 also includes a high pressure turbine 18, and a low pressure turbine 20. Engine 10 has an intake side 28 and an exhaust side 30. In one embodiment, engine 10 is a GE90 available from General Electric Company, Cincinnati, Ohio. Fan assembly 12 and low pressure turbine 20 are coupled by a first rotor shaft 31, and compressor 14 and high pressure turbine 18 are coupled by a second rotor shaft 32.

During operation, air flows axially through fan assembly 12, in a direction that is substantially parallel to a central axis 34 extending through engine 10, and compressed air is supplied to high pressure compressor 14. The highly compressed air is delivered to combustor 16. Combustion gas flow from combustor 16 drives turbines 18 and 20. Turbine 18 rotates compressor 14 via shaft 32 and turbine 20 drives fan assembly 12 via shaft 31.

Figure 2:
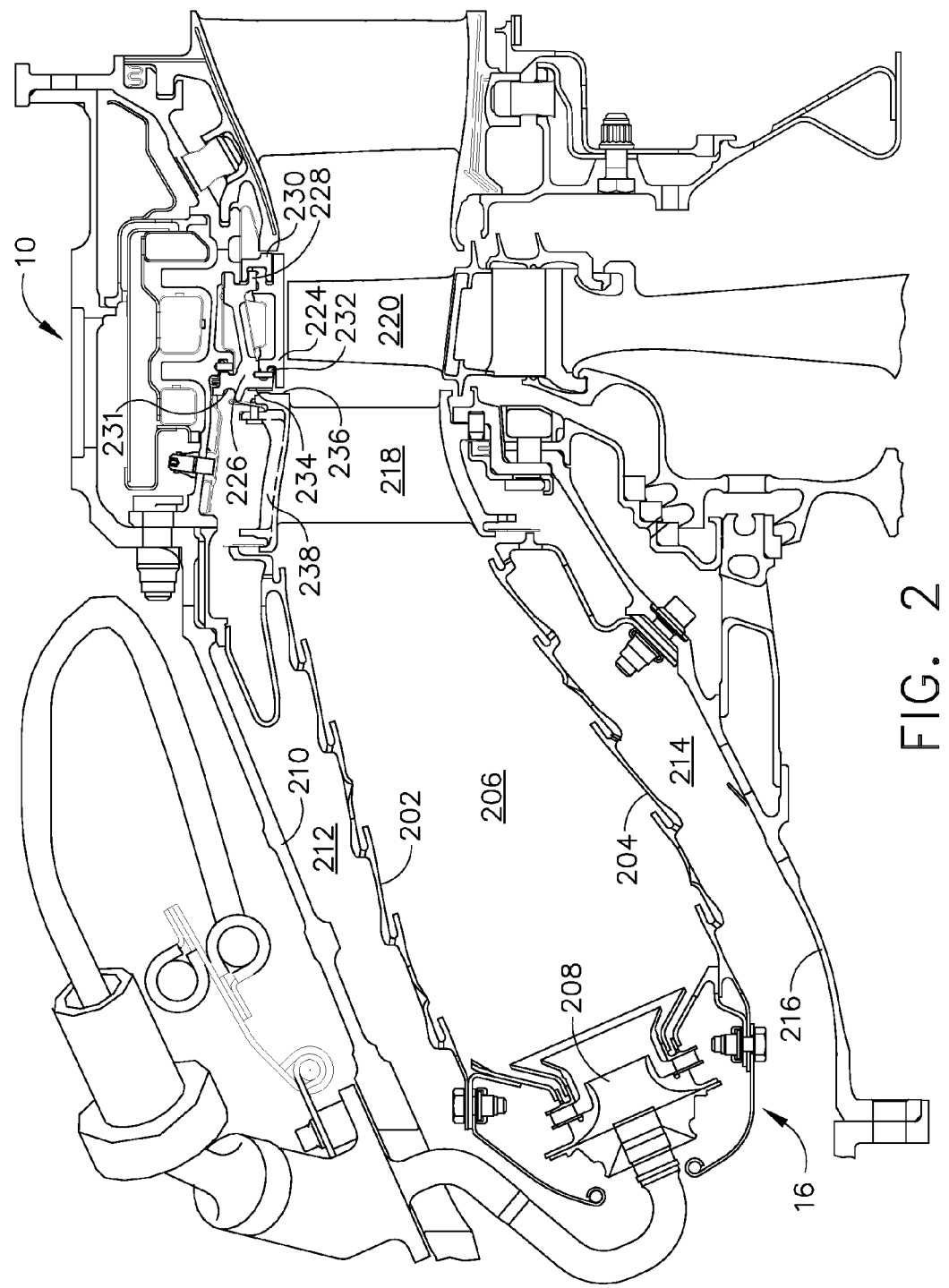
FIG. 2 is a cross-sectional view of a combustor that may be used with a gas turbine engine the engine shown in FIG. 1.

FIG. 2 is a cross-sectional view of a combustor 16 that may be used with a gas turbine engine, such as engine 10 (shown in FIG. 1). Combustor 16 includes an outer liner 202 and an inner liner 204 that define an annular combustion chamber 206 into which fuel is injected through a fuel nozzle 208 which extends inwardly through combustion case 210. Combustor 16 is partially cooled by airflow discharged from compressor 14 into an annular passageway 212 defined between combustor outer liner 202 and combustion case 210. Similarly, on the inner side of combustor 16 an annular chamber 214 is defined between inner liner 204 and nozzle support structure 216 to facilitate cooling combustor 16. Combustion gases discharged from combustor 16 are channeled from combustion chamber 206 through a row of circumferentially-spaced turbine nozzle segments 218 prior to impinging on the circumferentially-spaced row of turbine blades 220. An annular shroud 224 extends circumferentially about blades 220. Shroud 224 may be fabricated from a plurality of arcuate sectors coupled together. Structural support for shroud 224 is provided by a downstream end of a shroud hanger 226 that includes a radially inwardly extending hook 228 that is coupled to shroud 224 via a U-shaped bracket 230. An upstream end 231 forward end of shroud 224 is coupled to shroud hanger 226 via rearwardly extending collar 232.

An upstream face 234 of collar 232 is coupled against a downstream face 236 of a radially outward band 238 of a respective turbine nozzle segment 218. Contact between upstream face 234 and downstream face 236 substantially prevents flow between cooling air discharged from compressor 14 and combustion gases discharged from combustor 16. The temperature difference between the cooling air discharged from compressor 14 and the combustion gases discharged from combustor 16 may cause a differential thermal expansion between collar 232 and turbine nozzle segment 218 which may result in relative movement and stresses being induced between upstream face 234 and downstream face 236.

Figure 3:
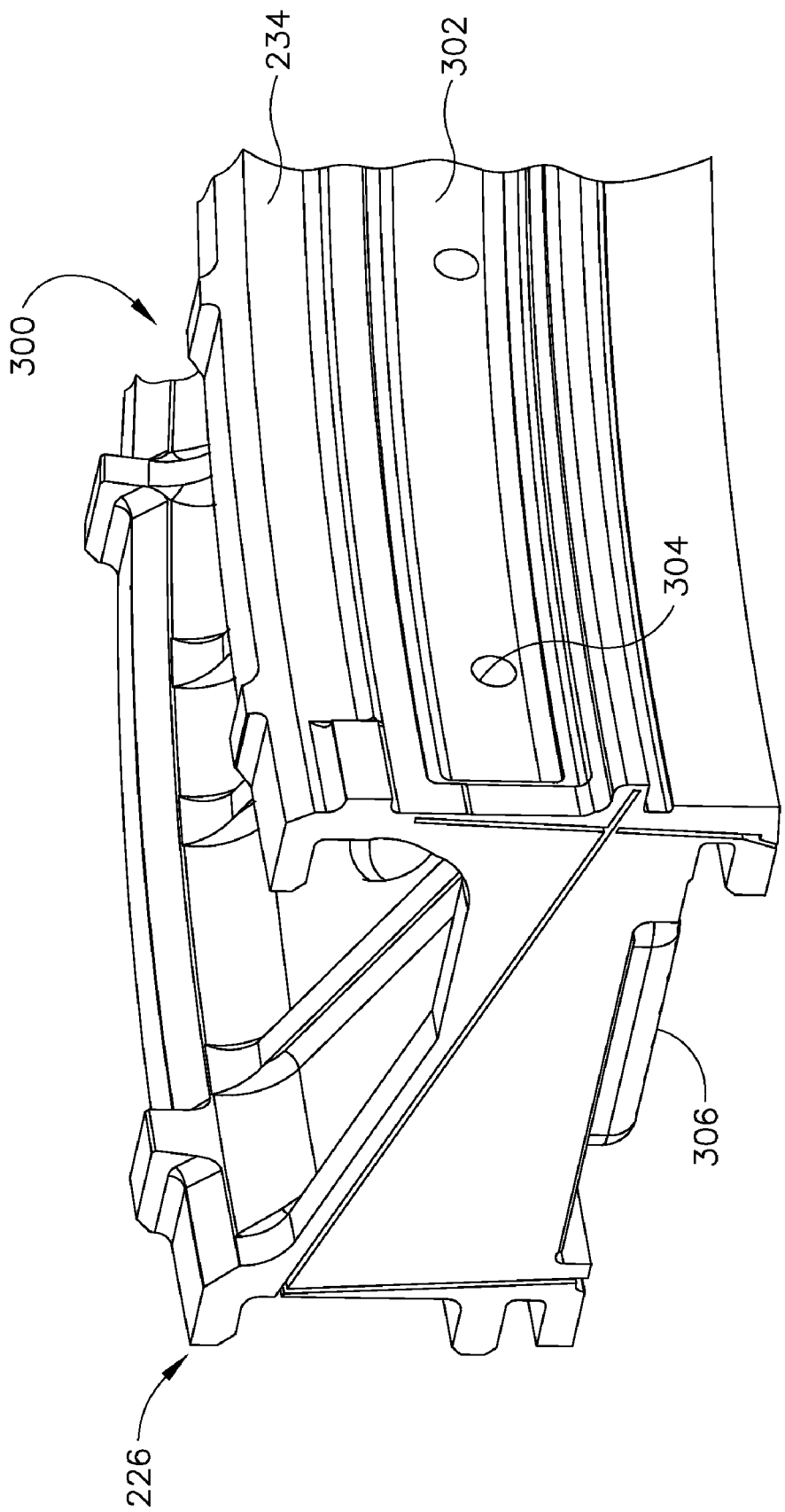
FIG. 3 is a perspective view of an exemplary shroud hanger that may be used with the gas turbine engine shown in FIGS. 1 and 2.
Figure 4:
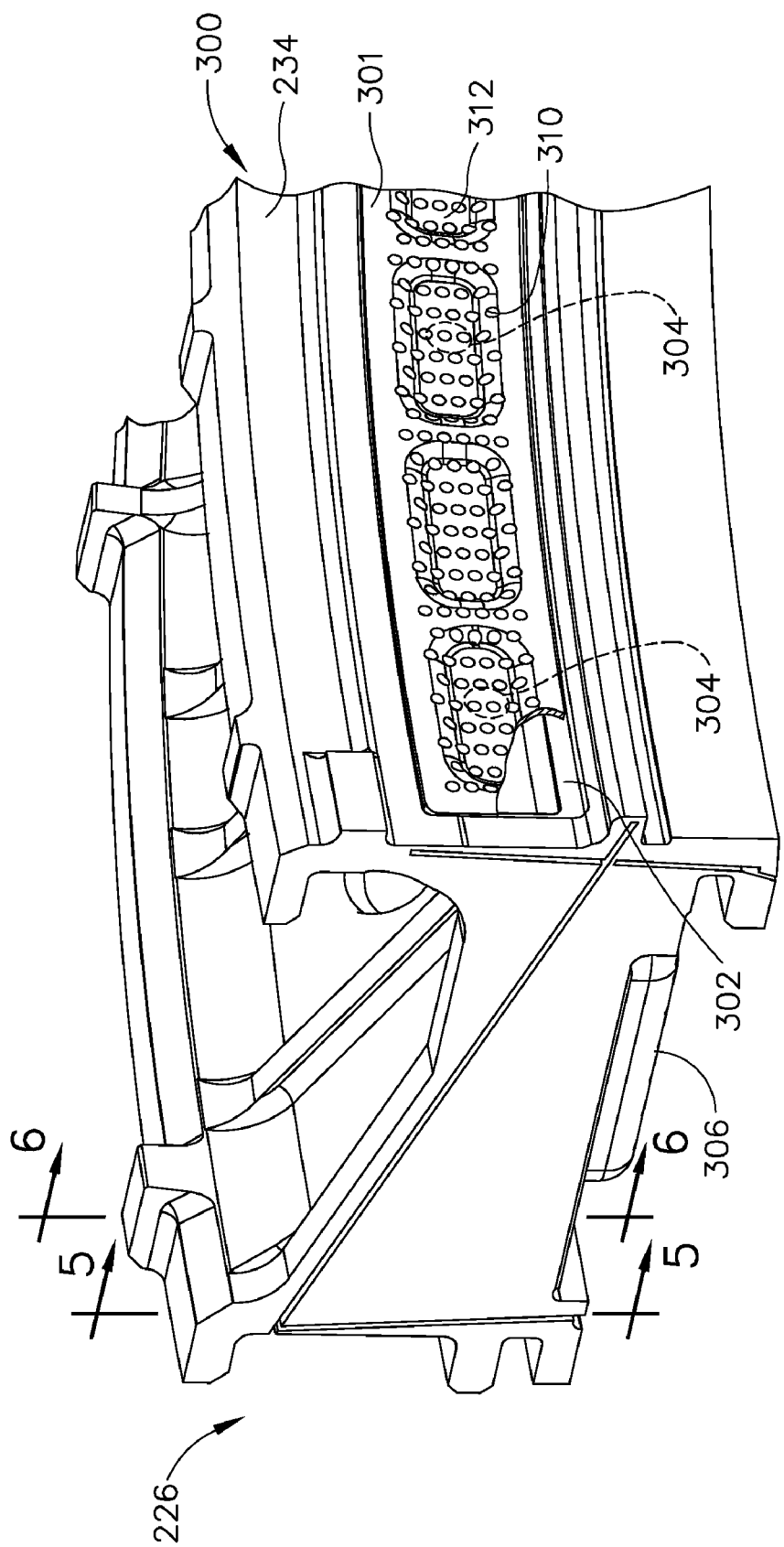
FIG. 4 is a perspective view of an exemplary shroud hanger, including a screen, that may be used with the gas turbine engine shown in FIGS. 1 and 2.
Figure 5:
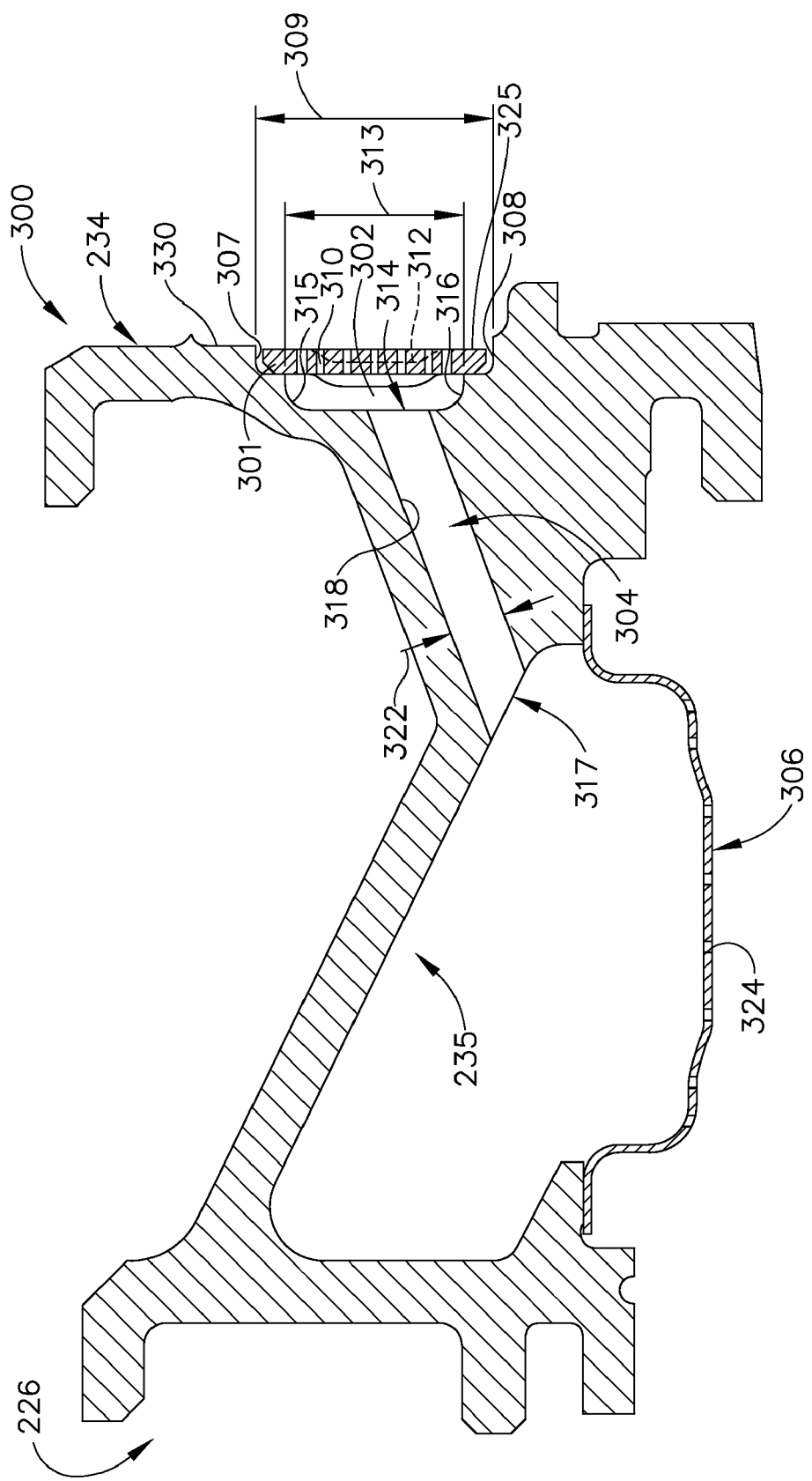
FIG. 5 is a first cross-sectional view of the shroud hanger shown in FIG. 4.
Figure 6:
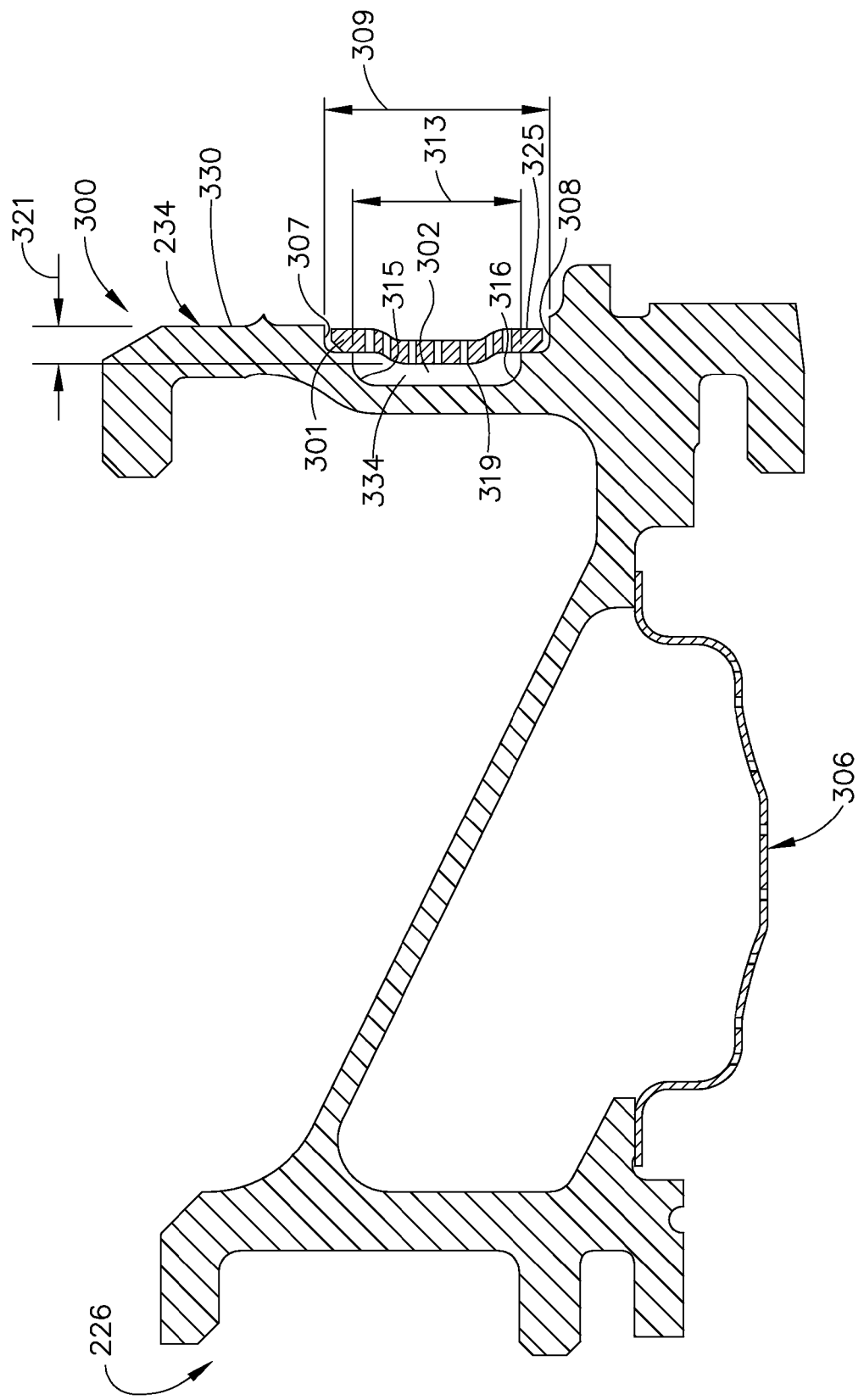
FIG. 6 is a second cross-sectional view of the shroud hanger shown in FIG. 4.

FIG. 3 is a perspective view of shroud hanger 226. FIG. 4 is a perspective view of shroud hanger 226 including a screen 301. FIG. 5 is a cross-sectional view of shroud hanger 226 taken along line 5-5 shown in FIG. 4. FIG. 6 is a cross-sectional view of shroud hanger 226 taken along line 6-6 shown in FIG. 4.

As shown in FIG. 3, an upstream face 234 of shroud hanger 226 extends across an upstream side 300 of shroud hanger 226. In the exemplary embodiment, shroud hanger 226 is formed with cavity 302 and includes a screen 301 coupled across cavity 302 as shown in FIG. 4. Screen 301 facilitates preventing debris from entering shroud hanger 226. Alternatively, shroud hanger 226 does not include screen 301. Furthermore, screen 301 is removable and can be easily replaced if the screen is damaged. A plurality of cooling passages 304 are defined within shroud hanger 226 and extend inwardly from cavity 302 towards an impingement baffle 306. The combination of screen 301, cavity 302, and cooling passages 304 significantly increases the number of routes in which cooling air can reach shroud 224. Impingement baffle 306 is coupled to a radially inward side 235 of shroud hanger 226.

Screen 301 is coupled to shroud hanger upstream side 300 against upstream face 234. In the exemplary embodiment, screen 301 extends radially from radial upper and lower edges 307 and 308, respectively, for a height 309. Screen 301 is positioned within and extends across cavity 302, as described below in more detail, to facilitate preventing debris from restricting airflow through shroud hanger 226. Screen 301 is formed with a plurality of openings 310 extending therethrough that enable air flow to enter cavity 302 through screen 301. In the exemplary embodiment, screen 301 is also formed with at least one pocket 312. Specifically, in the exemplary embodiment, screen 301 is formed with twice the number of pockets 312 as shroud hanger 226 has cooling passages 304. Alternatively, screen 301 may be formed with any number of pockets 312. Each pocket 312 is at least partially recessed in screen 301 such that an inner surface 319 of each pocket 312 is a distance 321 inward from an outer surface 325 of screen 301. Pockets 312 minimize the number of openings 310 that may be obstructed by large pieces of debris. Alternatively, screen 301 includes at least one convex pocket (not shown) that extends outward from outer surface 325. In the exemplary embodiment, each opening 310 is smaller than each cooling passage 304. Alternatively, openings 310 may be any size that enables screen 301 to function as described herein.

Cavity 302 is formed integrally within shroud hanger 226. Specifically, cavity 302 is defined within upstream side 300 and is partially defined by arcuate, radially-separated edges 315 and 316. Edges 315 and 316 extend axially downstream from edges 307 and 308, respectively, such that edges 315 and 316 enable screen 301 to be countersunk within cavity 302.

More specifically, when screen 301 is coupled within cavity 302, screen outer surface 325 is positioned substantially flush with respect to the portion of outer surface 330 of hanger upstream side 300 surrounding cavity 302. Cavity 302 includes a circumferentially-spaced portion 334 that is recessed inwardly from edges 315 and 316. Alternatively, cavity 302 includes any number of circumferentially-spaced portions 334. Each recessed portion 334 extends an inner height 313 between edges 315 and 316, and a circumferential distance. In the exemplary embodiment, inner height 313 is different than an outer height 309 of cavity 302 defined by edges 315 and 316, and more specifically, in the exemplary embodiment, inner height 313 is shorter than outer height 309. Alternatively, inner height 313 is approximately equal to outer height 309.

Each cooling passage 304 includes an inlet 314, an outlet 317, and a substantially cylindrical portion 318 extending therebetween. As such, in the exemplary embodiment, inlet 314 is formed with an inlet diameter 322 that is different than inner height 313 of cavity 302. More specifically, in the exemplary embodiment, inlet 314 is narrower than inner height 313. Alternatively, inlet diameter 322 is approximately equal to inner height 313.

In the exemplary embodiment, each cavity 302 extends circumferentially across at least two inlets 314 of cooling passages 304 such that cooling passages 304 are coupled together in flow communication at inlets 314 via cavity 302. Cooling passages 304 are interdependent via cavity 302 and extend radially inward between cavity 302 and impingement baffle 306. As such, in the exemplary embodiment, cooling passages 304 are configured to direct air inwardly from cavity 302 towards impingement baffle 306.

During operation, cooling air flows into shroud hanger 226 through screen openings 310. Cooling air is then channeled towards shroud hanger 226 such that cooling air flows through cavity 302. After the cooling air flows into cavity 302, the cooling air is then directed through plurality of cooling passages 304. After exiting cooling passages 304, the air is discharged towards impingement baffle 306 to facilitate cooling shroud 224.

When debris inadvertently flows into the engine, screen 301 prevents debris from entering shroud hanger 226. Moreover, because cooling passages 304 are coupled together in flow communication, debris remaining against screen 301 does not inhibit cooling air from flowing through shroud hanger 226. Pockets 312 in screen 301 facilitate minimizing the number of openings 310 that may be obstructed by large pieces of debris. As a result, the amount of air flow to shroud hanger 226 is facilitated to be increased when debris is present. If cooling air does not reach shroud 224, the life and durability of shroud 224 may be jeopardized. Furthermore, turbine efficiency may increase by improving the durability of shroud 224.

More specifically, if debris is present and abutting screen 301, recessed pocket 312 allows cooling air to flow around the debris and through other openings 310 in screen 301. Recessed pocket 312 also minimizes the number of screen openings 310 obstructed by any piece of debris and thus helps ensure an adequate flow rate of cooling air is supplied through shroud hanger 226 towards shroud 224.

After cooling air enters cavity 302, cooling air flows through cavity 302 until the cooling air reaches cooling passages 304. As such, cavity 302 functions similarly to a manifold for cooling passages 304. Interdependent cooling passages 304 provide a plurality of alternate routes through which cooling air can flow through shroud hanger 226. Cooling air entering cooling passages 304 is directed inwardly through cooling passage 304, and is discharged through outlets 317 through impingement baffle 306. Specifically, cooling air directed towards impingement baffle 306 is discharged through impingement baffle 306. Impingement baffle 306 includes orifices 324, as shown in FIG. 5, extending therethrough such that cooling air flows through orifices 324 for use in impingement cooling of shroud 224.

The method herein includes channeling cooling air towards the shroud hanger assembly such that cooling air flows through cavity 302 defined in the shroud hanger assembly. The method further includes directing the cooling air through plurality of cooling passages 304 extending from cavity 302. Additionally, cooling air is discharged from plurality of cooling passages 304 towards impingement baffle 306 to facilitate cooling shroud 224 hanging from shroud hanger 226.

The above-described methods and apparatus are a cost-effective and highly reliable means for operating a gas turbine engine. The shroud hanger assembly is formed with a cavity that couples a plurality of cooling passages defined within the assembly in flow communication. The plurality of openings facilitate impingement cooling of a shroud. A screen extends over the cavity to prevent debris from obstructing cooling air from flowing through the cooling passages. As a result, the shroud hanger assembly facilitates reducing the maintenance cycle-time of machines extending the useful line of the shroud in a cost-effective and reliable manner.

The exemplary embodiment of a shroud hanger are described above in detail. Each shroud hanger is not limited to use with the specific embodiments described herein, but rather, each shroud hanger can be utilized independently and separately from other components described herein. Moreover, the invention is not limited to the embodiments of the cavity and shroud hanger described above in detail. Rather, other variations of the cavity and shroud hanger may be utilized within the spirit and scope of the claims.

While the invention has been described in terms of various specific embodiments, those skilled in the art will recognize that the invention can be practiced with modification within the spirit and scope of the claims.

What is claimed is:

1. A method of operating a gas turbine engine, said method comprising:
   channeling cooling air towards a shroud hanger assembly such that the cooling air flows through a screen coupled to a cavity defined in an upstream face of the shroud hanger assembly;
   directing air into the cavity through the screen;
   directing the cooling air through a plurality of cooling passages extending from the upstream face of the shroud hanger assembly; and
   discharging the air from the plurality of cooling passages towards an impingement baffle to facilitate cooling a shroud hanging from the shroud hanger.

2. A method in accordance with claim 1 wherein directing air into the cavity through the screen further comprises:
   preventing debris from entering the cavity using the screen.

3. A method in accordance with claim 2 further comprising removing the screen for replacement.

4. A method in accordance with claim 2 further comprising:
   forming a plurality of openings within the screen; and
   directing air through the screen openings to facilitate cooling the shroud hanger assembly.

5. A method in accordance with claim 4 further comprising:
   forming a plurality of pockets within the screen; and
   positioning the screen to prevent debris from entering the plurality of cooling passages.

6. A shroud hanger assembly comprising:
   a shroud hanger; and
   an impingement baffle that is coupled to said shroud hanger, said shroud hanger comprises a cavity, a plurality of cooling passages defined therein and a screen coupled to an upstream face of said shroud hanger, each said cooling passage extends from the upstream face of said shroud hanger through said shroud hanger for channeling cooling air towards said impingement baffle, at least two of said cooling passages are coupled together in flow communication via said cavity.

7. A shroud hanger assembly in accordance with claim 6 wherein said cavity is coupled in flow communication with each of said plurality of cooling passages.

8. A shroud hanger assembly in accordance with claim 6 wherein said impingement baffle comprising orifices extending therethrough facilitates impingement cooling of a shroud radially inward from said shroud hanger assembly wherein cooling air flows through said orifices.

9. A shroud hanger assembly in accordance with claim 6 wherein said screen facilitates preventing debris from restricting air flow to said plurality of cooling passages.

10. A shroud hanger assembly in accordance with claim 6 wherein said screen comprises a plurality of openings extending therethrough and at least one recessed pocket.

11. A shroud hanger assembly in accordance with claim 6 wherein said screen comprises a plurality of openings extending therethrough and at least one convex pocket.

12. A gas turbine engine comprising:
   a compressor; and
   a turbine assembly coupled downstream said compressor, said turbine assembly comprising a shroud hanger assembly at least partially circumscribing the engine, said shroud hanger assembly comprising:
   a shroud hanger; and
   an impingement baffle that is coupled to said shroud hanger, said shroud hanger comprises a cavity, a plurality of cooling passages defined therein and a screen coupled to an upstream face of said shroud hanger, each said cooling passage extends from the upstream face of said shroud hanger through said shroud hanger for channeling cooling air towards said impingement baffle, at least two of said cooling passages are coupled together in flow communication via said cavity.

13. A gas turbine engine in accordance with claim 12 wherein said cavity is coupled in flow communication with each of said plurality of cooling passages.

14. A gas turbine engine in accordance with claim 12 wherein said impingement baffle comprising orifices extending therethrough facilitates impingement cooling of a shroud radially inward from said shroud hanger assembly wherein cooling air flows through said orifices.

15. A gas turbine engine in accordance with claim 12 wherein said screen comprises a plurality of openings extending therethrough and at least one recessed pocket.

16. A gas turbine engine in accordance with claim 12 wherein said screen comprises a plurality of openings extending therethrough and at least one convex pocket.

17. A gas turbine engine in accordance with claim 12 wherein said screen facilitates preventing debris from restricting air flow to said plurality of cooling passages.

* * * * *

UNITED STATES PATENT AND TRADEMARK OFFICE
CERTIFICATE OF CORRECTION

PATENT NO. : 7,607,885 B2 Page 1 of 1
APPLICATION NO. : 11/461042
DATED : October 27, 2009
INVENTOR(S) : Bosley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 476 days.

Signed and Sealed this

Twelfth Day of October, 2010

David J. Kappos
*Director of the United States Patent and Trademark Office*